INVENTOR.
DONALD K. MELVIN
BY C. R. Gulbrandsen
ATTY.

July 27, 1965 D. K. MELVIN 3,197,569

TRUNK AND ATTENDANT'S CIRCUIT ARRANGEMENT FOR AN ELECTRONIC SWITCHING EXCHANGE

Filed Nov. 28, 1961 2 Sheets-Sheet 2

INVENTOR.
DONALD K. MELVIN

BY

ATTY.

United States Patent Office 3,197,569
Patented July 27, 1965

3,197,569
TRUNK AND ATTENDANT'S CIRCUIT ARRANGEMENT FOR AN ELECTRONIC SWITCHING EXCHANGE

Donald K. Melvin, San Carlos, Calif., assignor to Automatic Electric Laboratories, Inc., Northlake, Ill., a corporation of Delaware Filed Nov. 28, 1961, Ser. No. 155,281
8 Claims. (Cl. 179—27)

This invention relates to a trunk and attendant's circuit arrangement for an electronic switching exchange, and more particularly to a ringdown trunk circuit arrangement for use in a private automatic branch exchange having time division multiplex scanning and supervisory control.

The object of the invention is to provide an efficient and effective arrangement for the handling of calls between local subscribers and central office trunk lines.

A principal feature of the invention relates to an arrangement for detecting ringing current signals received over the trunk line on an incoming call to repeat a seizure signal to the local switching equipment upon the first splash of ringing current and to give an indication of the call, such as a flashing lamp signal, which continues until the attendant operates the answer key.

Another feature relates to a common attendant's dialing circuit which is associated only with the trunk circuit having the answer key in the answer position, arranged so that the attendant may dial a call into the local exchange or alternatively dial out over the trunk line, but never both simultaneuosly, under the control of a dial-control key in each trunk circuit.

Further features relate to flashing recall, and to a common release circuit.

Figure 1:
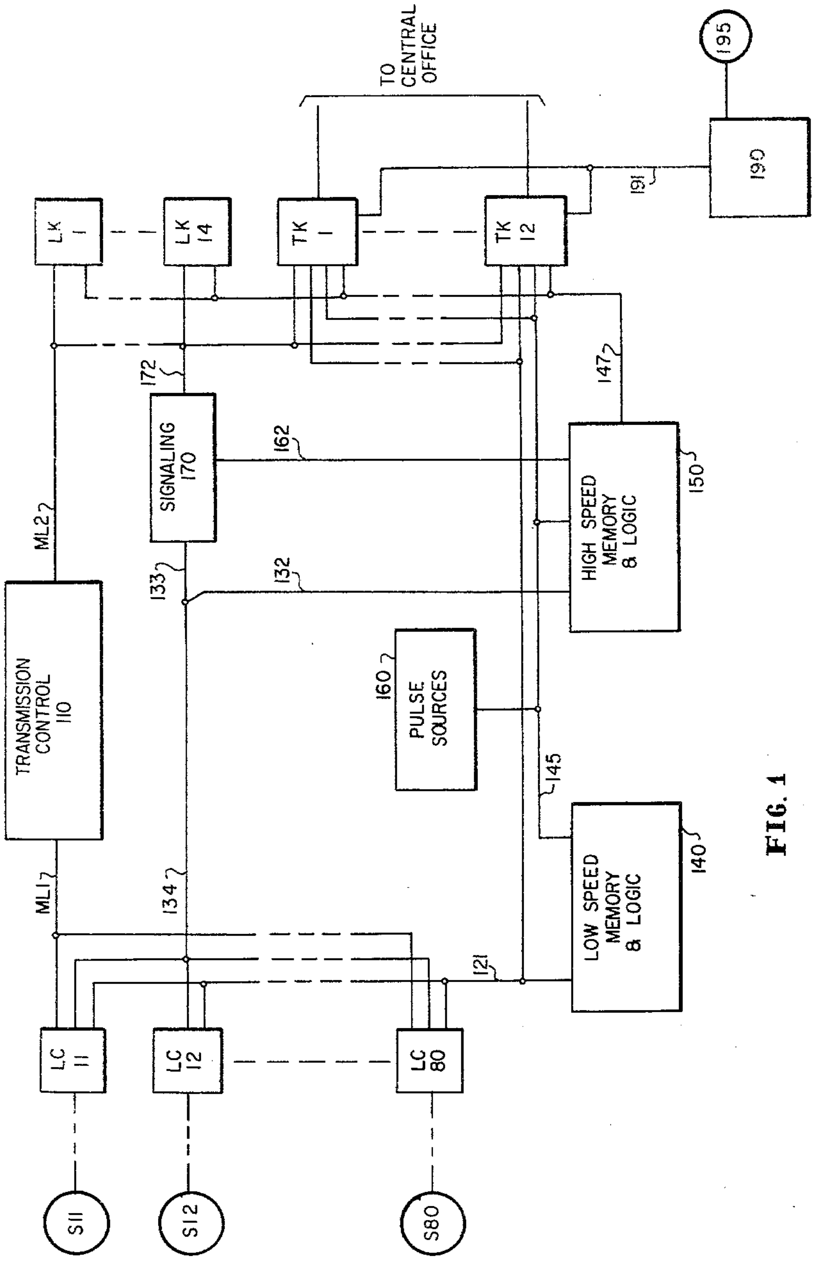
Figure 2:
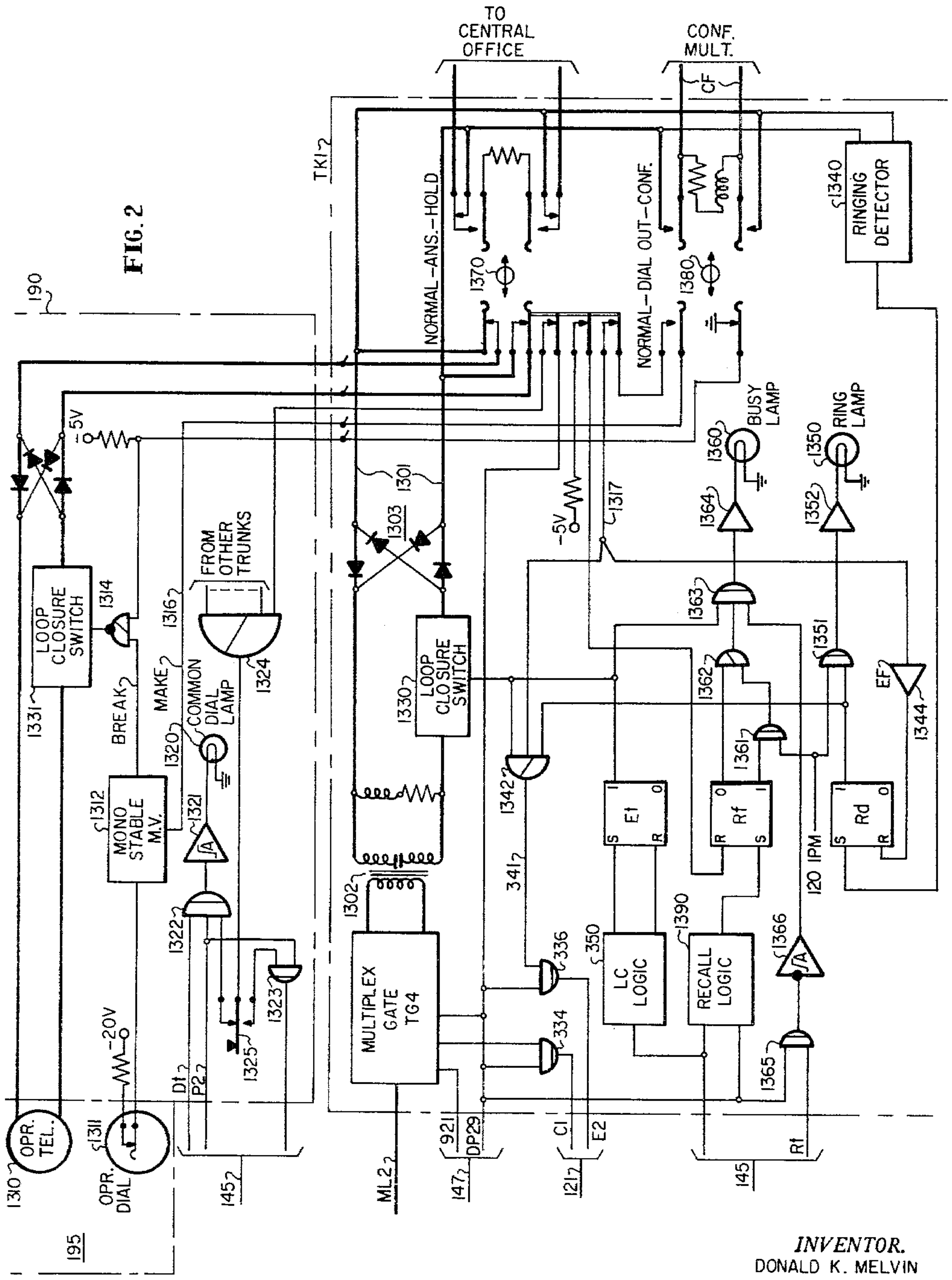

The above-mentioned and other objects and features of this invention and the manner of obtaining them will become more apparent and the invention itself will be best understood by reference to the following description of an embodiment of the invention taken in conjunction with the accompanying drawings comprising FIGURES 1 and 2, wherein:

FIG. 1 is a single line block diagram of a time division multiplex telephone exchange; and FIG. 2 is a functional block and schematic diagram of one trunk circuit and part of the attendant's equipment.

The electronic exchange is shown by a single line block diagram in FIG. 1. Line circuits LC11 to LC80 associated with stations S11 to S80 are connected in common to the end ML1 of a time division multiplex transmission highway. Link circuits LK1 to LK14 and trunk circuits TK1 to TK12 are connected in common to the other end ML2 of the transmission highway. Equipment 190 and an attendant's telephone 195 are common to the trunk circuits TK1 to TK12.

A transmission control unit 110 may be interposed between the two ends of the multiplex transmission highway. Any two line circuits may be connected through any link circuit, or any line circuit may be connected to any trunk circuit by selectively supplying control pulses to them.

The signalling circuits 170 supply supervisory tones and ring control signals which are transmitted either by time division multiplex over line 172 and the highway ML1–ML2, or over conductors in line 133–134.

The function of remembering which circuits are interconnected on a time division multiplex basis over highway ML1–ML2 and of supplying control pulses to the selected transmission gates in the appropriate time slots is performed by a high-speed memory and logic 150.

The control pulses are supplied to the line circuits over line 132–134, to the link and trunk circuits over line 147, and to the signalling circuits over line 162.

The selective registration in the high-speed memory is controlled by the low-speed memory and logic 140. These circuits 140 control the line-finding function of scanning to find a line which has initiated a call and causing a connection to be established to the calling line; and the connector function of detecting dial pulses from the calling line and causing a connection to be established to the called line, and also trunk and transfer functions. These control circuits 140 are shared by all of the links and trunks on a time division basis, using a low-speed ferrite core memory for storage.

The pulse sources 160 comprise pulse generators and distributors for supplying all of the pulses required by the exchange.

A private automatic branch exchange of the type shown in FIG. 1 is disclosed in the United States patent application of A. H. Faulkner and D. K. Melvin for an Electronic Switching System, Serial No. 135,823, filed September 5, 1961. FIG. 3 of that patent application shows a simple functional block diagram of a trunk circuit. This trunk circuit and equipment 195 common to all of the trunks is shown in further detail in FIG. 2 of the present application.

Referring now to FIG. 2, each of the trunk circuits such as trunk TK1 includes a three-position answer key 1370, a dialing and conference key 1380, a busy lamp 1360, and a ring lamp 1350 which appear on a cordless attendant's cabinet. The cabinet will also have a common dial lamp 1320 shown in the common equipment 190. The line loop from the central office is connected through normally closed contacts on the right-hand side of switch 1370 to the line 1301 and thence through a diode bridge 1303, a loop-closure switch 1330, and a line transformer 1302, to a multiplex gate TG4. The multiplex gate TG4 causes communication signals associated with the trunk TK1 to be transmitted to and received from the two-way time division multiplex common transmission conductor ML2 in the individual time slot under the control of a pulse on conductor DP29. The gate TK4 is selectively controlled by a switch-through signal appearing in its time slot DP29 on conductor 921. The various flip-flops and logic circuits control the loop closure, and other functions in the trunk circuit. The logical true or "1" condition is −5 volts, and the false or "0" condition is ground potential.

The operator's telephone 1310 is connected over a line including its own loop-closure switch 1331 and a diode bridge circuit to the contacts of the answer keys of all trunks. Any answer key in the center answer position connects the operator's telephone loop to the corresponding central office trunk loop. The operator's dial 1311 is isolated from her telephone circuit 1310, and is used to control either the loop closure switch 1331 for outgoing dialing to the central office, or to dial in through the monostable vibrator 1312 and line 1316 through circuits of one of the trunk circuits to set up a connection through the electronic exchange.

The loop-closure switches 1330 and 1331 may comprise electronic arrangements such as transistor circuits.

The exchange is also provided with a conference circuit CF which is connected in multiple to the keys 1380 of all of the trunk circuits. This conference multiple CF may also be reached through special line circuits to permit connections from local subscribers.

A common release key 1325 is supplied with time slot identification pulses from all trunks, through contacts of the respective answer keys and gate 1324. When the key 1325 is depressed the DP pulse from any trunk having its key 1370 in answer position is supplied in coincidence with signal P2, through gate 1323, to supply a release signal to common control.

The output of the integrating amplifier 1366 is normally —5 volts, and becomes a steady ground potential when a train of pulses appear on lead R*t* in coincidence with the pulses on lead DP29, during the ringing sequence state in common control for this trunk.

Assume now that an incoming call is received from the central office. Ringing current applied to the central office loop is applied through the right-hand contacts of key 1370 to line 1301 and appears at the input of ringing detector 1340. The ringing detector equipment 1340 converts the alternating ringing current to a negative five-volt signal to set the flip-flop R*d*. The flip-flop R*d* in its set "1" state applies a signal through gate 1351 under the control of the 120 IPM interrupter signal to amplifier 1352 to flash the ring lamp 1350. The output from flip-flop R*d* is also applied through gate 1342 to an input of gate 336, so that in the time slot DP29 pulses appear on the common trunk supervisory conductor E2. Since flip-flop R*d* will not be reset until the operator answers this trunk, the ringing lamp will continue to flash even after ringing current has ceased to be applied to the trunk. The purpose of marking lead E2 in this trunk's time slot, at this time, is to make sure that the electronic trunk circuit will be available at the time when the operator wants to dial the local subscriber number into this trunk. If this trunk had not been marked busy at this time it would be possible for a subscriber on the electronic exchange to place an outward call and seize the trunk before the operator was able to extend the incoming call to the electronic exchange over it. It should be noted that the answer key 1370 in the trunk circuit is a three-position key with an offset cam. The normal position of this key prevents the operator's telephone circuit from bridging a trunk circuit. To answer an incoming call the operator operates the answer key 1370 to the answer position thus tripping the ring trip relay of the central office electro-mechanical exchange and, at the same time, resetting flip-flop R*d*. The reset signal is applied from common conductor 1316 through contacts on the left hand side of key 1380 and contacts on the left hand side of key 1370 to lead 1317, and thence through an emitter follower amplifier 1344 to the reset input of the flip-flop R*d*. (It is assumed that the key 1380 is in its normal position, that is operated to the left.) Even though flip-flop R*d* has been reset, this trunk's time slot will be marked busy on lead E2 by the signal applied through the answer key 1370 to conductor 1317 which is applied through gate 1342 to the input of gate 336.

When flip-flop R*d* was reset, the flashing ring lamp 1350 was extinguished. The operator may now obtain the name or number of the desired party from the calling party. In order to enable the operator to dial the desired number without having to operate any more keys, and without having a local dial tone go out over the trunk, it is necessary to provide a common dial lamp 1320 on the attendant's cabinet to signal the attendant when dialing may proceed. At any given time the common dial lamp 1320 is associated with the one answer key that is off normal. If the attendant desires to hold the electro-mechanical trunk while dialing into the electronic trunk, this may be done by operating the answer key to the hold position. Holding the electro-mechanical trunk will not affect dialing or transmission over the electronic trunk. The common dial lamp 1320 receives its input through an amplifier 1321 from gate 1322. The signal through key 1325 is normally true, and when dialing into the electronic exchange may commence, a signal appears on lead D*t* in coincidence with signal P2 to enable the gate 1322 and thus cause the lamp 1320 to light.

The operator's dial circuit is equipped with a standard telephone dial 1311 and a monostable multivibrator 1312. When the dial impulse springs are closed, a signal of —5 volts will be present on the make output to lead 1316 from the multivibrator. When the impulse springs are open, a signal of —5 volts will be present on the break lead to an input of gate 1314. Impulses on the make lead are used for dialing the electronic trunk while impulses on the break lead are used for pulsing the trunk loop. When the attendant desires to dial the electronic trunk circuit the dial-out key must be in its normal position. Dial impulses on the make lead 1316 of the multivibrator are applied through contacts of key 1380 and key 1370 to lead 1317 and thence through gate 1342 to gate 336. Therefore the dial impulses will appear as a train of pulses in time slot DP29 on lead E2. This train of pulses appears when the dial impulse springs of dial 1311 are closed and will not be present when the impulse springs are open. A connection is then set up in the electronic exchange as explained in the said copending application so that the trunk TK1 and the selected local subscriber line are connected by way of a time division multiplex path occurring in time slot DP29 on the common multiplex conductor. A signal condition is also returned over line 145 from the common control equipment, which by way of the loop closure logic 350 sets the flip-flop E*t*. This operates the loop closure switch 1330 to its operative position to complete the transmission path, applies a signal through gate 1342 to supply an input to gate 336 so that pulses continue to appear during time slot DP29 on conductor E2, and applies a signal through gate 1363 and amplifier 1364 to light the busy lamp 1360. The attendant retires from the circuit by returning the answer key 1380 to its normal position. The busy lamp 1360 will burn steadily during conversation.

If the called party desires to signal the attendant he may do so by depressing the hookswitch once, or by taking special dialing action, then waiting for the attendant to answer. The recall logic 1390 will set the recall flip-flop R*f*. With flip-flop R*f* in the set 1 state, the busy lamp gate 1363 is inhibited by the 120 IPM interrupter output at gate 1361. Even when the loop is again closed by the subscriber, flip-flop R*f* remains set and the lamp 1360 continues to flash.

The attendant answers a flashing recall by operating the answer key 1370 to its answer position. An off normal spring on the answer key resets flip-flop R*f* and the busy lamp again burns steadily. If the trunk party desires to talk to another local party, the attendant depresses a common trunk release key 1325 which resets the electronic trunk circuit to normal and releases the connection to the local subscriber. The dial lamp 1320 will burn as before and a new number may be dialed.

At disconnect, the release of the local trunk is under the control of the attendant. When the local loop is opened at disconnect, the busy lamp will flash as mentioned for flashing recall. When the attendant answers, the busy lamp will extinguish. To release the trunk, the attendant operates the common trunk release key 1325 thus clearing the electronic trunk and resetting flip-flop E*t*. The trunk loop is opened and the trunk circuit released.

For outgoing calls the operation is essentially the same as described in said copending application. A connection is established between the calling local subscriber and the trunk circuit, which by means of the loop closure logic 350 causes the flip-flop E*t* to be set. This causes the loop to the central office to be closed through loop closure switch 1330, the busy lamp 1360 to burn, and the train of pulses to be returned in time slot DP29 by way of gate 336 to the common supervisory conductor E2. The busy conductor C1 also has a train of pulses in time slot DP29 from gate 334. The flip-flop E*t* follows dial impulses from the local subscriber, causing the impulses to be repeated to the central office by means of the loop closure switch 1330.

To provide the flashing recall feature, the common control equipment described in said prior copending application needs some modification. For example referring to FIG. 6 of said prior application, an additional recirculating flip-flop designated $Kb$ may be added, and a corresponding column of cores in the low speed memory 140 having cores only in the trunk rows. This flip-flop may be controlled by logic in the trunk and transfer logic unit 601. Also the output X10 from the trunk transfer sequence logic unit 602 is used. The recall is initiated by the local subscriber by depressing the hookswitch once or by dialing a digit greater than one. Reference should be made to section J4 of said prior copending application for a description of the transfer action. Making use of the logic quantities described in the prior application, the following equations should be added to accomplish the flashing recall transfer. In response to the local subscriber depressing the hookswitch or dialing a digit greater than one, the transfer sequence switch is advanced to its state X10.

$$X10=Ea'P2XtLX9B(RF200+R')$$

This causes the recirculating flip-flop $Kb$, and the flashing recall flip-flop $Rf$ of the particular trunk to be set.

$$Kb=Rf=X10P2XtT$$

The transfer sequence switch is then set to the clear state.

$$X8=X10P6XtT$$

The transfer then proceeds as described in section J4b of said prior application.

While I have described above the principles of my invention in connection with specific apparatus it is to be clearly understood that this description is made only by way of example and not as a limitation to the scope of my invention.

What is claimed is:

1. In a communication switching system in which a local exchange serves a plurality of local subscriber lines and a plurality of trunk lines extending to a central exchange, with switching equipment in the local exchange for selectively establishing connections between any two local line terminals or between a local line terminal and a trunk line terminal;
   said switching equipment comprising common control apparatus which includes a source of cyclically recurring pulses in individual time slots, and a recirculating memory arranged to store switching information associated with the individual time slots and during each time slot to supply the information to and receive signals from associated circuits and to selectively modify the information, with each of said trunk lines being individually associated with one of said time slots;
   trunk circuits individually associated with the trunk lines for controlling connections to the corresponding terminals, each trunk circuit comprising
   an answer key means having a normal condition and an answer condition,
   supervisory gate means having an input connection to a line from said pulse source on which cyclically recurring pulses appear in the time slot individually associated with the corresponding trunk line and having an output connection to a common time division multiplex supervisory conductor for supplying supervisory signals to said switching equipment,
   and ringing detection means coupled to the associated trunk line, including a bistable device, arranged to set said device to an off-normal state in response to the beginning of a ringing current signal received over the trunk line;
   means responsive to the off-normal state of the ringing-detection bistable device for indicating the call and for enabling the supervisory gate means to couple said cyclically recurring pulses in the individual time slot of the trunk line to said common supervisory conductor to cause an in-use condition of the trunk to be registered by said switching equipment,
   means responsive to actuation of the answer key means to the answer condition for resetting the ringing-detection bistable device to normal while maintaining the supervisory gate means enabled to supply said cyclically recurring pulses to the common supervisory conductor to continue the in-use registration in the switching equipment.

2. In a communication switching system, the combination as claimed in claim 1, wherein said ringing detection bistable device remains set to its off-normal state until the answer key means is actuated to the answer condition, irrespective of whether or not the ringing current continues to be received on the trunk line.

3. In a communication switching system, the combination as claimed in claim 1, further including an operator's calling device and signalling circuit,
   each said trunk circuit including dial-control key means, and an arrangement for coupling said common calling device and signalling circuit to said supervisory signal means of the trunk circuit having its answer key means in the answer condition and its dial control key means in a normal condition, so that signals generated by said calling device enable said supervisory gate means to supply said cyclically recurring pulses in said individual time slot by way of said common conductor to the switching equipment to cause a connection to be established between the trunk line terminal and a local line terminal.

4. In a communication switching system, the combination as claimed in claim 3, wherein each said trunk circuit includes a busy lamp which is caused to be lighted whenever the trunk circuit is in use, and a recall bistable device,
   means responsive to a recall signal from the connected local line terminal for setting the recall bistable device to an off-normal condition, to thereby couple an interrupter signal to said busy lamp to cause it to flash, the recall bistable device remaining set and therefore the busy lamp continuing to flash independently of the recall signal from the local line terminal,
   means responsive to the actuation of the answer key means to the answer condition for resetting the recall bistable device.

5. In a communication switching system, the combination as claimed in claim 4, wherein said dialing control key means is so arranged that with the answer key means in the answer condition and the dialing control key means in the normal condition the common calling device and signalling circuit is coupled to the supervisory gate means of the corresponding trunk circuit to supply cyclically recurring pulses to the common conductor, and with the answer key means in the answer condition and the dialing control means in an off-normal condition, the common calling device and signalling circuit is associated with said trunk line so that calling signals may be transmitted over said trunk line to said central exchange,
   the arrangement being such that the common calling device and signalling circuit is never associated with both the supervisory gate means and the trunk line at the same time.

6. In a communication switching system, the combination as claimed in claim 5, further including a common release key means,
   an arrangement coupling the recurring pulses of any trunk circuit having its answer key means in the answer condition to the common release key,
   and means responsive to the actuation of the release key means for causing a release signal to be transmitted to the switching equipment to thereby cause the release of the connection between a local line terminal and the terminal of said trunk circuit.

7. In a communication switching system, the combination as claimed in claim 5, wherein said answer key means comprises a switch having three positions, "normal," "answer" and "hold," and the "normal" position is one extreme.

3. In a communication switching system, the combination as claimed in claim 1, in which an in-use registration in the switching equipment for each said trunk line terminal may be effected responsive to said cyclically recurring pulses in the individual time slot of that trunk line on said common conductor, or for an outgoing call in response to seizure of the trunk line for a connection from a calling local line;

wherein each said trunk circuit further includes a loop-control bistable device and means for operating it under the control of said common control apparatus to be in a set condition whenever there is an in-use registration corresponding to that trunk line in said common control apparatus, and means responsive to this bistable device being in the set condition for enabling said supervisory gate means to supply said cyclically recurring pulses in the individual time slot to said common conductor, and means also responsive to said bistable device being in the set condition for closing a connection between said trunk line and said switching equipment.

References Cited by the Examiner

UNITED STATES PATENTS

| | | | |
|---|---|---|---|
| 2,827,517 | 3/58 | Armstrong | 179—27 |
| 2,993,095 | 7/61 | Arnold | 179—27 |
| 3,055,982 | 9/62 | Kowalik | 179—27 |

ROBERT H. ROSE, *Primary Examiner.*

WALTER L. LYNDE, *Examiner.*